(12) United States Patent
Daly

(10) Patent No.: US 6,324,952 B1
(45) Date of Patent: Dec. 4, 2001

(54) SAW ASSEMBLY AND LUBRICATION SYSTEM

(75) Inventor: Ted M. Daly, Owatonna, MN (US)

(73) Assignee: Blount, Inc., Montgomery, AL (US)

( * ) Notice: Subject to any disclaimer, the term of this patent is extended or adjusted under 35 U.S.C. 154(b) by 0 days.

(21) Appl. No.: 09/418,094

(22) Filed: Oct. 14, 1999

(51) Int. Cl.[7] .................. A01G 23/08; F16C 33/66
(52) U.S. Cl. .................. 83/169; 384/474; 144/34.1; 83/928
(58) Field of Search .................. 384/474, 477–489; 83/169, 928; 144/336, 4.1, 34.1, 34.5, 24.13

(56) References Cited

U.S. PATENT DOCUMENTS

| | | |
|---|---|---|
| 2,514,799 | 7/1950 | Rubertino et al. . |
| 2,676,856 * | 4/1954 | Kohse .................. 384/474 |
| 2,858,176 * | 10/1958 | Thompson .................. 384/477 |
| 3,749,459 | 7/1973 | Matuzaki et al. . |
| 3,762,725 * | 10/1973 | Taylor .................. 277/330 |
| 3,932,006 | 1/1976 | Tertinek et al. . |
| 4,387,752 * | 6/1983 | Tyer .................. 144/34.5 |
| 4,541,738 | 9/1985 | Leibensperger et al. . |
| 4,784,500 * | 11/1988 | Prokop .................. 384/474 |
| 4,820,061 | 4/1989 | Dolfsma et al. . |
| 4,844,625 | 7/1989 | Katsuzawa et al. . |
| 4,881,829 | 11/1989 | Koelsch . |
| 4,895,460 | 1/1990 | Grzina . |
| 4,952,077 | 8/1990 | Kurt . |
| 4,988,218 | 1/1991 | Quaglia . |
| 5,113,919 * | 5/1992 | MacLennan .................. 83/928 |
| 5,150,769 | 9/1992 | Major et al. . |
| 5,150,975 | 9/1992 | Major et al. . |
| 5,211,484 | 5/1993 | Quaglia . |
| 5,246,087 * | 9/1993 | Schipper .................. 384/474 |
| 5,387,039 * | 2/1995 | Bien .................. 384/477 |
| 5,618,116 * | 4/1997 | Ishikawa .................. 384/482 |
| 5,642,946 * | 7/1997 | Caillault et al. .................. 384/486 |
| 5,647,444 * | 7/1997 | Williams .................. 175/209 |
| 5,658,053 | 8/1997 | Vencill et al. . |
| 5,690,391 * | 11/1997 | Kingsley et al. .................. 83/928 |
| 5,910,195 * | 6/1999 | Ziemer et al. .................. 384/484 |
| 6,152,201 * | 11/2000 | Kurelek .................. 144/336 |

* cited by examiner

*Primary Examiner*—Kenneth E. Peterson
*Assistant Examiner*—Stephen Choi
(74) *Attorney, Agent, or Firm*—Richard G. Lione; Brinks Hofer Gilson & Lione

(57) ABSTRACT

A bunching saw assembly for a timber harvesting machine includes a vertical spindle which drives a horizontally oriented, rotary saw disc. Upper and lower bearing sub-assemblies support the spindle in a saw assembly housing. The bearing sub-assemblies include roller bearings which operate in separate bearing cavities, supplied with lubricant through independent lubricant inlet passages, and vented through independent lubricant vent passages.

6 Claims, 4 Drawing Sheets

SAW ASSEMBLY AND LUBRICATION SYSTEM

FIELD OF THE INVENTION

This invention relates generally to timber harvesting and, more particularly, to the construction and operation of a rotary bunching saw in a feller buncher machine. It relates specifically to the bearing lubrication system for the vertical spindle which supports a horizontally rotating saw disc in a bunching saw.

BACKGROUND OF THE INVENTION

The feller buncher attachment for a timber harvesting tractor conventionally has a horizontally rotating circular saw, or a horizontally operating shear, mounted in the attachment frame. In the rotary saw embodiment, the saw disc is mounted on the lower end of a vertical spindle supported for rotation in a housing on the attachment frame. A hydraulic motor mounted on top of the housing rotates the spindle and, accordingly, the saw disc.

In such a conventional bunching saw assembly, the spindle is supported in upper and lower bearings seated within the saw assembly housing. A vertically elongated cavity within the housing surrounds the shaft and contains the upper and lower bearings. The base of a drive motor body covers the top of the cavity and a main housing seal forms the bottom of the cavity. To lubricate the bearings, a grease zerk fitting is conventionally provided in the housing above the upper bearing and another is provided between the upper and lower bearings.

The amount of grease injected into the various cavities within the vertically elongated cavity is prescribed by the manufacturer and is based on specified hourly or daily consumption rates. Because the amount of grease consumed varies with operating conditions, more or less grease than that prescribed by the manufacturer may be consumed, however. If consumption is greater than anticipated, inadequate lubrication eventually results and bearing failure is possible.

Problems also result if grease consumption is less than anticipated. The cavities will then be overfilled by manufacturer-dictated lubrication. All cavities within the housing tend to fill before grease is forced out of relief fittings normally provided to permit air to escape during grease injection. This excess of grease acts as an insulator, causing the operating temperature of bearings to rise and reducing their service life. Since the relief fittings are conventionally located where they cannot be seen, the operator doesn't know that the cavities are overfilled.

In addition to the aforedescribed problems associated with conventional systems, a substantial amount of grease is required to fill the entire cavity. This increases operation costs.

SUMMARY OF THE INVENTION

It is an object of the invention to provide an improved bunching saw assembly for a timber harvesting machine.

It is another object of the invention to provide an improved lubrication system for the rotating vertical spindle in a bunching saw assembly.

It is another object to provide an improved lubrication system wherein a separate lubricant cavity is associated with each of the upper and lower bearings supporting the rotating vertical spindle in a bunching saw assembly.

It is another object to provide an improved lubrication system which requires much less lubricant because separate upper and lower bearing cavities, combined, are much smaller than the cavity in conventional assemblies.

It is still another object to provide an improved lubrication system wherein each of the separate lubricant cavities encircles the spindle and has an inlet zerk fitting and an outlet vent fitting positioned in such a manner that the presence of lubricating grease at each bearing can positively be confirmed.

The foregoing and other object of the present invention are realized in a bunching saw assembly wherein a vertical spindle drives a horizontally oriented saw disc fixed to its lower end. The spindle extends vertically through a saw assembly housing supported by vertically spaced upper and lower bearing sub-assemblies mounted in the housing cavity. A fluid motor seated on top of the housing, over the cavity, is drivingly connected to the spindle.

According to the invention, a lower bearing seal is mounted in the housing cavity immediately above the lower bearing sub-assembly. The lower bearing seal is seated on an annular support surface extending around the cavity above this seal. An upper bearing seal is mounted in the housing cavity immediately below the upper bearing sub-assembly. The upper bearing seal is seated on an annular support surface extending around the cavity below this seal.

The upper and lower bearing sub-assemblies include bearings which are, accordingly, disposed in separate upper and lower bearing cavities. The upper bearing cavity has a grease inlet passage extending radially outwardly from it, through the housing, above the bearing, and a grease vent passage extending radially outwardly from it, through the housing, below the bearing. The lower bearing cavity has a grease inlet passage extending radially outwardly from it, through the housing, above the bearing, and a grease vent passage extending radially outwardly from it, through the housing, also above the bearing. The inlet and vent passages for the lower bearing cavity are opposite each other relative to the axis of the assembly, i.e., 180° apart. On the other hand, the inlet and vent passages for the upper bearing cavity are displaced only 43° from each other.

BRIEF DESCRIPTION OF THE DRAWINGS

The invention, including its construction and method of operation, is illustrated more or less diagrammatically in the drawings, in which.

DESCRIPTION OF THE PREFERRED EMBODIMENT

Figure 1:
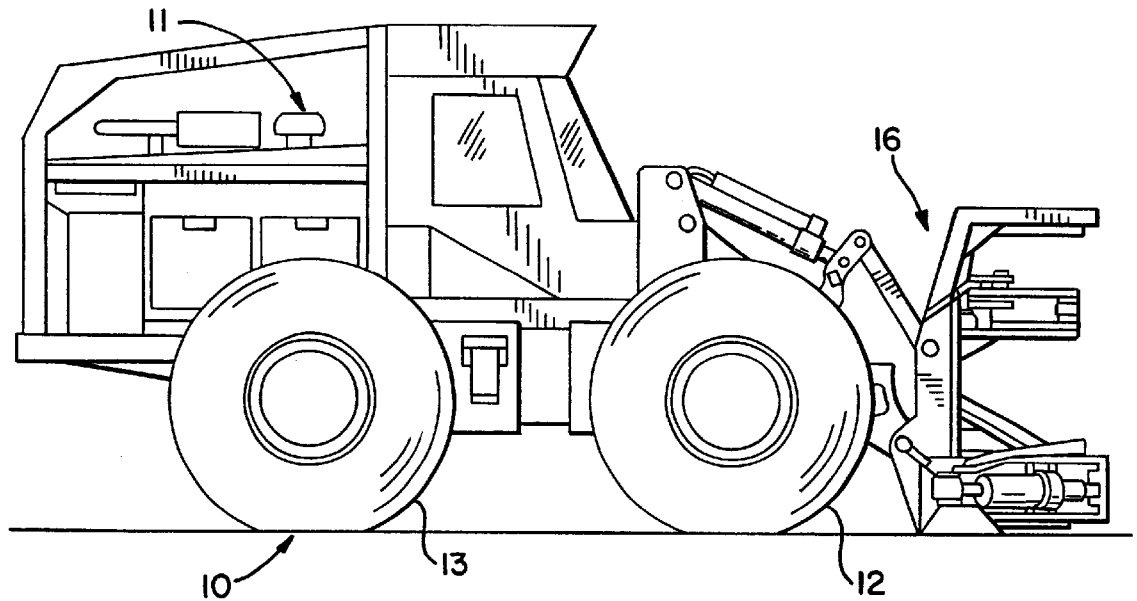
FIG. 1 is a side view of a bunching saw attachment on a timber harvesting, feller-buncher machine.

Referring to the drawings, and particularly to FIG. 1, a feller buncher machine is shown generally at 10. The feller buncher machine 10 includes a four-wheel drive tractor 11 having two front wheels 12 and two rear wheels 13, although it could be a three wheel tractor with only one rear wheel.

A bunching saw attachment 16 is mounted on the front end of the tractor 11, between the front wheels 12. In operation, the attachment 16 cuts a number of trees, one-by-one, and holds them upright in a bunch as the tractor 11 moves the attachment from tree-to-tree. When a prescribed number of trees have been felled and bunched in this manner, the feller buncher carriers them out of the cutting area and deposits them for subsequent transport.

Figure 2:
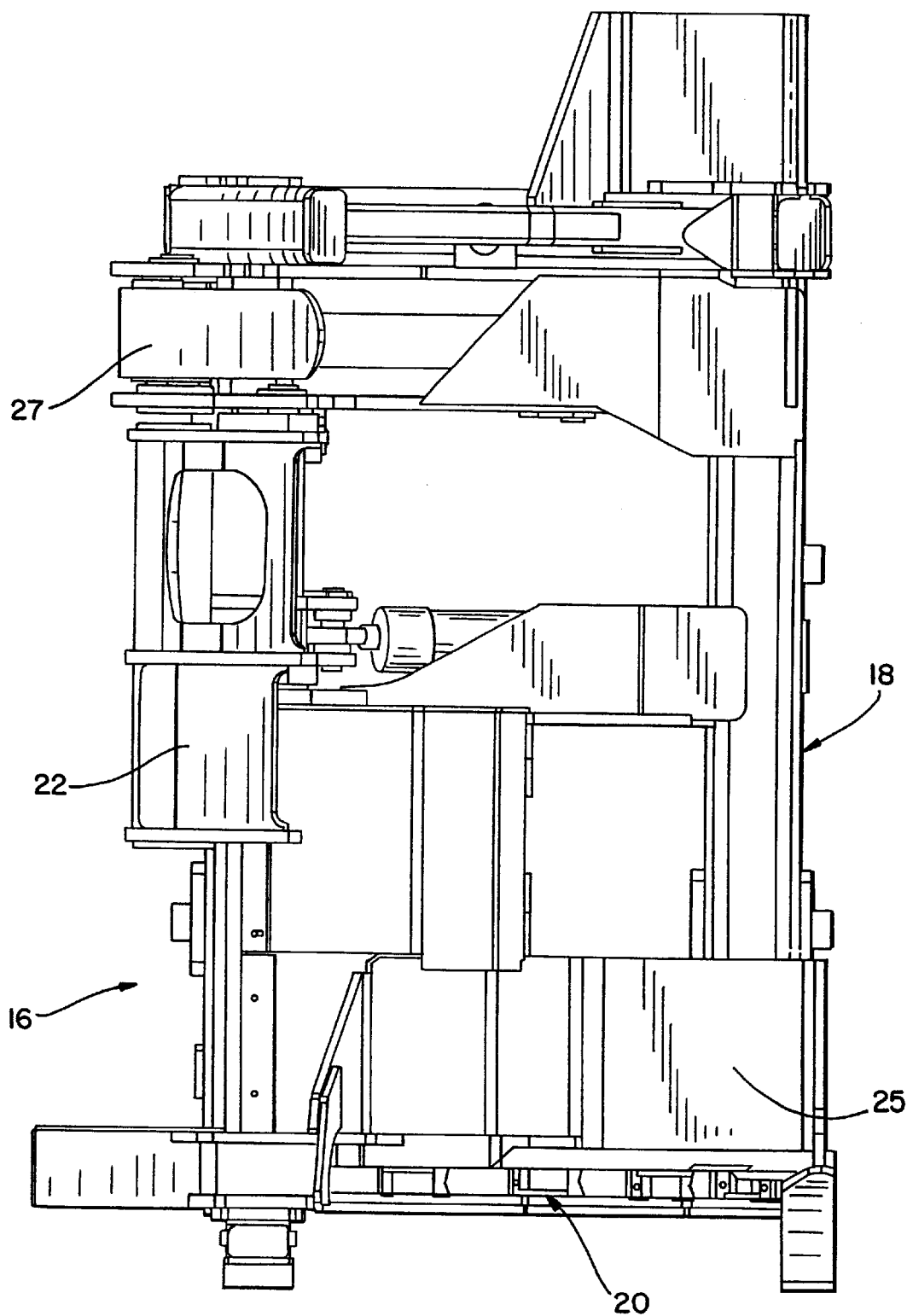
FIG. 2 is an enlarged front elevational view of the bunching saw attachment illustrated in FIG. 1.
Figure 3:
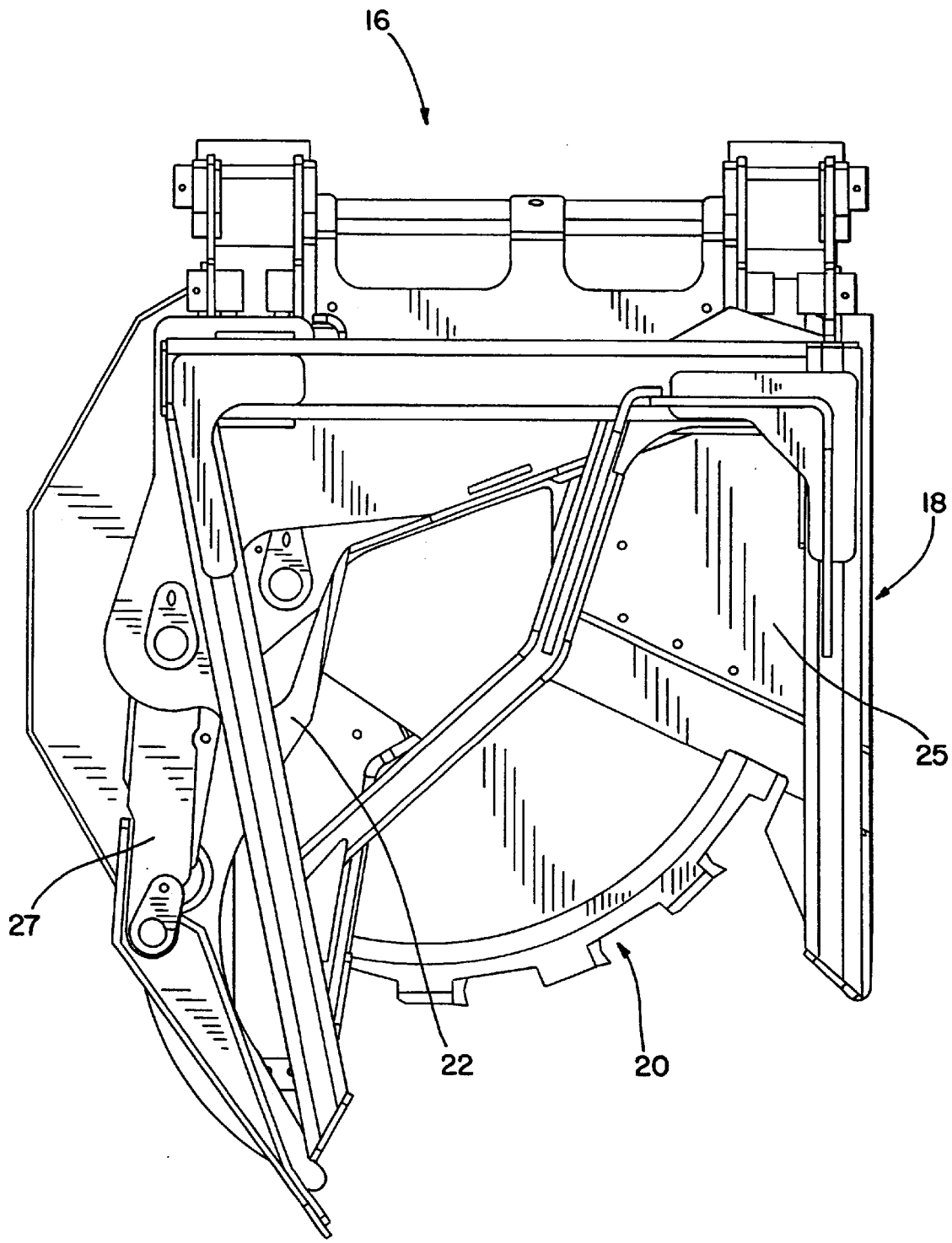
FIG. 3 is a top plan view of the bunching saw attachment illustrated in FIG. 2.

Referring now to FIGS. 2 and 3, the bunching saw attachment 16 is seen to comprise a frame 18 in which a disc saw assembly 20 embodying features of the present invention is mounted. The disc saw assembly 20 is centered in the back of the frame 18, between a gathering arm arrangement 22 on one side and a severed tree accumulation pocket 25 on the other side. The gathering arm arrangement 22 engages each tree as it is cut and moves the severed tree into the pocket 25. A bunching arm 27 then engages and holds the severed tree in this position while the gathering arm arrangement 22 pivots back into its open position, to be prepared for the next tree.

Figure 4:
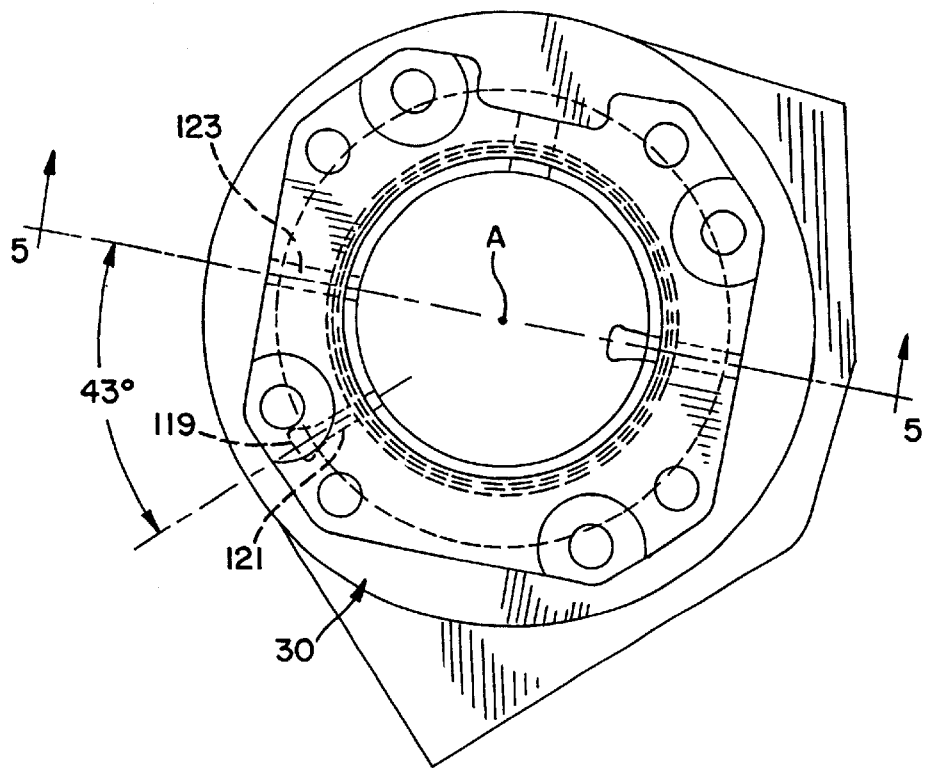
FIG. 4 is a top plan view of the saw motor mount and drive shaft bearing housing for the disc saw in the attachment.
Figure 5:
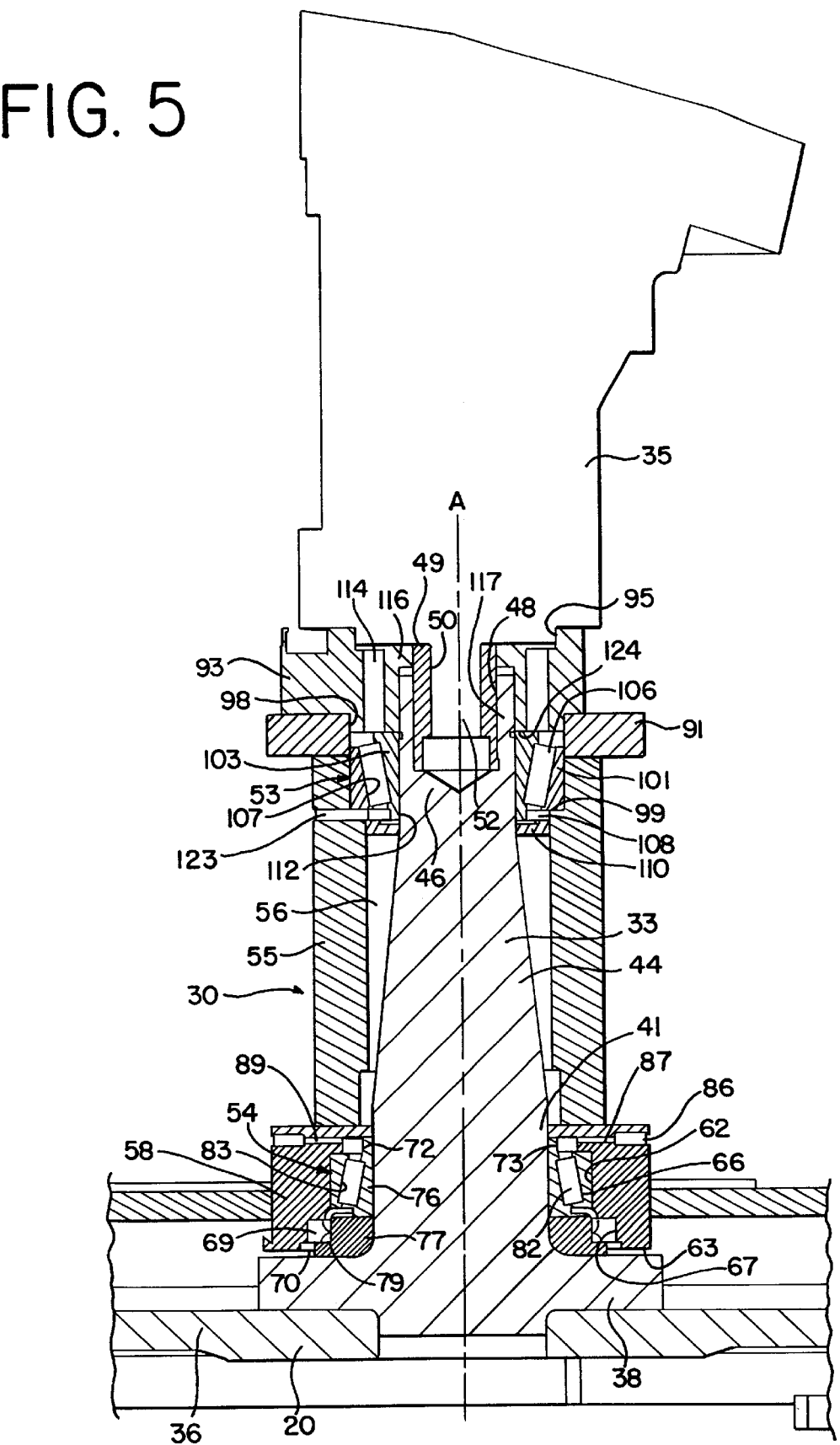
FIG. 5 is an enlarged front view, partially in section along line 5—5 of FIG. 4, showing the lubrication system of the invention.

Referring now also to FIGS. 4 and 5, the rotary disc saw assembly 20 includes a vertically oriented saw housing 30. The housing 30 contains a vertically oriented spindle 33 which it supports for rotation within the housing on the axis A of the spindle.

As seen only in FIG. 5, the spindle 33 is rotated in the housing 30 by a fluid motor 35 mounted on top of the housing and drivingly connected to the spindle. A circular saw disc 36 is mounted on a lower end plate 38 of the spindle 33.

The spindle 33 includes a cylindrical lower section 41 which extends upwardly from the lower end plate 38 of the spindle. The lower end plate 38 is formed unitarily with the spindle 33.

The spindle 33 further includes a tapered intermediate section 44 and a cylindrical upper section 46, the upper section being of lesser diameter than the lower section 41 and being joined to that lower section by the tapered intermediate section 44.

The upper section 46 of the spindle 33 has an internally splined well 48 formed axially into its free end. An externally splined sleeve 49 is seated in the well 48 and protrudes upwardly, out of the well.

The sleeve 49 is also internally splined, at 50. The splines 50 in the sleeve 49 receive an externally splined output shaft 52 protruding downwardly from the hydraulic motor 35 on the axis A of the spindle 33.

The spindle 33 is supported for rotation in the housing 30 on an upper bearing sub-assembly 53 and a lower bearing sub-assembly 54. The upper bearing sub-assembly 53 supports the spindle 33 on the upper section 46 of the spindle. The lower bearing sub-assembly 54 supports the spindle 33 on the lower section 41 of the spindle.

The saw housing 30 includes a vertically elongated, generally cylindrical body 55 which encloses the intermediate section 44 of the spindle 33, leaving a tapered cavity 56 between the inside of the body and the spindle. The body 55 is seated on an annular support ring 58, which is rigidly mounted in the attachment frame 18.

The annular support ring 58 has an annular bearing well 62 formed upwardly into it from its lower face 63. Seated in the well 62, from below, is the outer bearing race 66 of the lower bearing sub-assembly 54. Below the outer bearing race 66, an annular main housing seal well 67 extends outwardly of the bearing well 62, immediately above the lower face 63. A main housing seal 69 is seated in the seal well 67. The main housing seal is positively retained by a snap ring 70.

Above the outer bearing race 66, an annular lower bearing seal well 72 is formed around the inside of the ring 58. An annular lower bearing seal 73 is seated in the well 72.

Snugly fit onto the cylindrical lower section 41 of the spindle 33 is an inner bearing race 76. The inner bearing race 76 is located on the cylindrical lower section 41 by a spacer ring 77 which spaces the bearing race 76 from the lower end plate 38 of the spindle 33, and is held in place by the end plate. The ring 77 has an outwardly extending lower lip 79 which underlies the lower bearing seal well 67 when the saw spindle 33 is operatively mounted in the housing 30.

Both the outer bearing race 66 and the inner bearing race 76 are tapered outwardly, from top to bottom, where they oppose each other and seat a series of roller bearings 82 extending around the spindle 33. The roller bearings 82 form a lower bearing cavity 83 between the bearing races 66 and 76, and rotate in that cavity. The balance of the cavity 83 is normally filled with lubricating grease.

Lubricating grease is injected into the cavity 83 through a zerk port 86 on a radially extending grease passage 87. The passage 87 opens into the cavity 83 at the inner end of the passage, immediately outward of the lower bearing seal 73.

Opposite the grease passage 87, i.e., 180° removed therefrom around the support ring 58, is a grease vent passage 89. The grease vent passage 89 communicates with the bearing cavity 83 immediately outward of the lower bearing seal 73.

According to the invention, grease is injected into the zerk port 86 until the cavity 83 has filled and grease begins to emerge from the vent passage 89. The operator then knows the roller bearings 82 are fully lubricated between the races 66 and 76. The main housing seal 69 prevents the grease from escaping below the bearing sub-assembly 54.

The body 55 of the saw housing 30 has a mounting ring 91 seated on its upper end. The mounting ring 91 is rigidly mounted in the frame 18 and supports the upper end of the housing 30, as well as serving as an anchor plate for the motor 35.

Seated on top of the mounting ring 91 is a spacer ring 93. The spacer ring 93 has an internal pilot shoulder 95 formed around its upper surface for receiving a corresponding pilot ring on the bottom of the motor 35. The spacer ring 93 has an external pilot shoulder 98 formed around its lower surface for seating onto the mounting ring 91.

The body 55 of the housing 30 has an annular shoulder 99 formed in its inner surface immediately below the mounting ring 91. The outer bearing race 101 of the upper bearing sub-assembly 53 is seated on this shoulder 99.

Snugly fit onto the cylindrical upper section 46 of the spindle 33 is the inner bearing race 103 of the upper bearing sub-assembly 53. Both these bearing races 101 and 103 are tapered inwardly, from top to bottom, where they oppose each other and seat a series of roller bearings 106 extending around the spindle 33.

The roller bearings form an upper bearing cavity 107 between the bearing races 101 and 103, and rotate in that cavity. The bearing cavity 107 opens downwardly into an annular grease cavity 108 defined below by an annular seal support ring 110 secured to the inner surface of the body 55 about 0.39 inches below those races. An annular upper bearing seal 112 is mounted between the inner bearing race 103 and the ring 110, against the outer periphery of the spindle 33. The ring 110 is spaced 0.39 inches below the shoulder 99 supporting the outer bearing race 101.

The bearing cavity 107 opens upwardly into an annular grease cavity 114 defined above by the inside of the spacer ring 93 and the annular outer surface of a cap nut 116. The cap nut 116 is internally threaded at 117 so it can be turned onto the externally threaded upper end of the spindle section 46.

The cavities 114, 107, 108 are filled with grease through a grease inlet zerk port 119 and passage 121 (see FIG. 4). The passage 121 extends radially into communication with the cavity 114. A grease vent passage 123 extends radially out from the cavity 108 below the bearing sub-assembly 53, displaced only 43° from the grease inlet passage 121 around the axis A of the spindle 33.

According to the invention, grease is injected into the inlet zerk port 119. It fills the cavity 114 above the roller bearings 106 first, and only then migrates under pressure down through the bearing filled cavity 107 until it fills the cavity 108. Grease emerging from the vent passage 123 indicates that the roller bearings 106 are fully lubricated.

The saw assembly 20 is assembled by press fitting the ring 77 onto the spindle 33 until it seats on plate 38. The inner bearing race 76, carrying the bearing rollers 83 and their supporting cage (not shown) is then press fit onto the spindle 33 against the ring 77. The annular lower bearing seal 73 is then slid down the spindle 33 until it rests on the inner bearing race 76.

The aforedescribed spindle 33 sub-assembly is then inserted upwardly through the housing 30 until the inner race 76 and bearing rollers 82 contact the outer race 66. The annular upper bearing seal 112 is slid down the spindle 33 until it seats on the support ring 110. The upper inner bearing race 103 is placed over the spindle 33 and seats against the roller bearings 106 in their cage (not shown) resting on the outer bearing race 101.

The cap nut 116 is then threaded downwardly onto the end of the spindle 33. The annular lower lip 124 of the cap nut 116 engages the inner bearing race 103 and draws the spindle 33 upwardly through it until only a prescribed amount of endplay is achieved between the lower inner race 76 and the lower outer race 66.

At this point, the internally and externally splined sleeve 49 is slipped into the well 48, keying the end of the spindle 33 and the cap nut 116 together. This locks cap nut 116 in place and the spindle 33 and housing 30 together. The motor can then be mounted with its splined output shaft 52 extending into the sleeve 49.

The saw assembly 20 is operational after the saw disc 36 is mounted. The saw disc 36 may be mounted after the aforedescribed assembly operations are completed or, in the alternative, the saw disc 36 and spindle 33 can be preassembled.

The spindle 33 has been shown and described as tapered in its intermediate section. However, it should be understood that in some embodiments of the invention it may not be tapered. Similarly, the construction and operation of the cap nut 116 might be varied without affecting the lubrication system embodying features of the invention.

Lubrication of the upper and lower bearing sub-assemblies 53 and 54 is simple and inexpensive with the lubrication system of the present invention. The system assures positive feedback to the operator on when the bearing sub-assemblies are properly greased. In addition, whereas conventional lubrication systems require 10–30 pumps of grease a day, the present system may use only 2–3 pumps a day. Furthermore, with less grease, bearing operating temperature is lower, resulting in longer bearing life.

While a preferred embodiment of the invention has been described, it should be understood that the invention is not so limited, and modifications may be made without departing from the invention. The scope of the invention is defined by the appended claims, and all devices that come within the meaning of the claims, either literally or by equivalence, are intended to be embraced therein.

What is claimed is:

1. A rotary saw assembly for a timber harvesting machine, comprising:
   a) a vertically oriented saw housing having a generally cylindrical body;
   b) a vertically elongated spindle having a disc saw on its lower end, said spindle extending upwardly through said housing from a cylindrical lower spindle section to a cylindrical upper spindle section, said upper and lower spindle sections being separated by an intermediate spindle section;
   c) said spindle being supported for rotation on its vertical axis in said housing on an upper bearing sub-assembly in said housing and a lower bearing sub-assembly in said housing;
   d) an upper bearing seal mounted in said housing immediately below said upper bearing sub-assembly;
   e) a lower bearing seal mounted in said housing immediately above said lower bearing sub-assembly;
   f) said upper bearing assembly including an inner bearing race and an outer bearing race defining a bearing cavity between them in which bearing elements are mounted;
   g) said lower bearing assembly including an inner bearing race and an outer bearing race defining a bearing cavity between them in which upper bearing elements are mounted;
   h) a grease inlet passage to said upper bearing cavity above its bearing races and a grease outlet passage from said upper bearing cavity below its bearing races; and
   i) a grease inlet passage to said lower bearing assembly cavity above its bearing races and a grease outlet passage from said upper bearing assembly cavity above its bearing races;
   j) said housing containing a first grease cavity above said upper bearing cavity and a second grease cavity below said upper bearing cavity;
   k) said grease inlet passage to said upper bearing cavity being connected to said first grease cavity and said grease outlet passage from said upper bearing cavity being connected to said second grease cavity;
   l) each of said first and second grease cavities extending entirely around said spindle axis.

2. The rotary saw assembly of claim 1 further characterized in that:
   a) said grease inlet passage to said lower bearing cavity is displaced about 180° around the axis of said spindle from said grease outlet passage to said lower bearing cavity.

3. The rotary saw assembly of claim 2 further characterized in that:
   a) said grease inlet passage to said upper bearing cavity is displaced less than 180° around the axis of said spindle from said grease outlet passage to said upper bearing cavity.

4. The rotary saw assembly of claim 2 further characterized in that:
   a) said grease inlet passage to said upper bearing cavity is displaced less than 90° around the axis of said spindle from said grease outlet passage to said upper bearing cavity.

5. The rotary saw assembly of claim 1 further characterized in that:
   a) said grease inlet and outlet passages to said lower bearing cavity opening directly into said lower bearing cavity.

6. The rotary saw assembly of claim 1 further characterized in that:
   a) said intermediate spindle section is tapered from said lower spindle section inwardly to said upper spindle section.

\* \* \* \* \*